(No Model.)
E. CRIPPEN & W. KING.
BRIDLE.
No. 379,005. Patented Mar. 6, 1888.
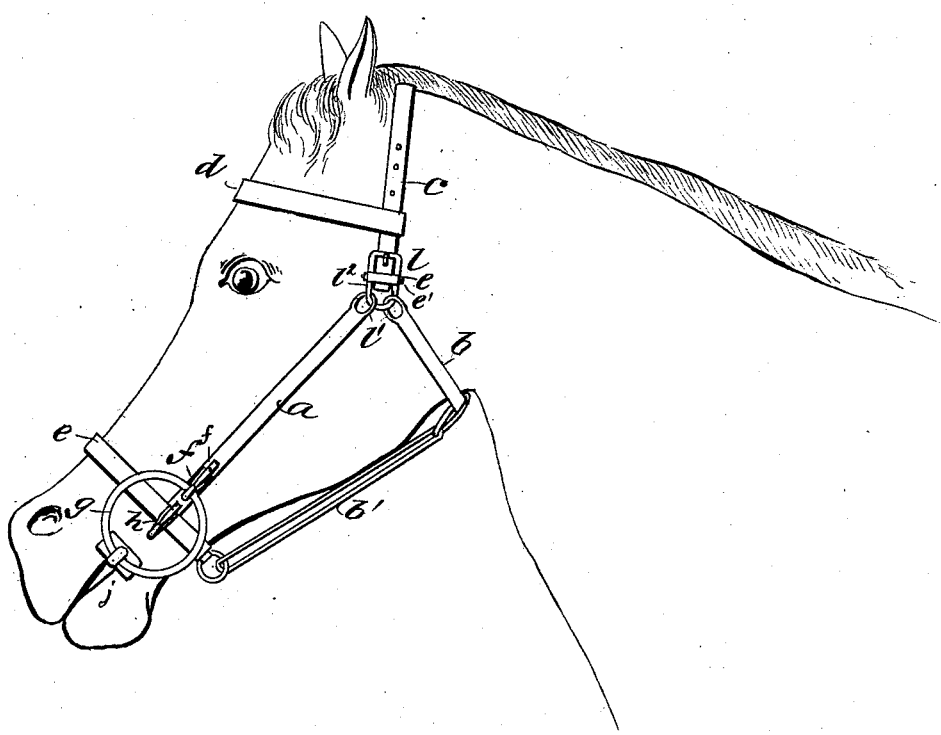
WITNESSES:
INVENTOR:
Edwin Crippen
William King
BY Munn & Co
ATTORNEYS.

UNITED STATES PATENT OFFICE.

EDWIN CRIPPEN AND WILLIAM KING, OF NEW ORLEANS, LOUISIANA.

BRIDLE.

SPECIFICATION forming part of Letters Patent No. 379,005, dated March 6, 1888.

Application filed July 28, 1887. Serial No. 245,522. (No model.)

*To all whom it may concern:*

Be it known that we, EDWIN CRIPPEN and WILLIAM KING, both of New Orleans, in the parish of Orleans and State of Louisiana, have invented a new and useful Improvement in Bridles, of which the following is a full, clear, and exact description.

Our invention relates to certain improvements in bridles; and the invention consists of the construction, arrangement, and combination of parts, all as hereinafter described and claimed.

Reference is to be had to the accompanying drawing, forming a part of this specification, in which the figure illustrates our new bridle placed upon a horse's head.

The cheek-strap $a$, throat-straps $b\ b'$, head-strap $c$, forehead-stap $d$, and nose-strap $e$ may be of the usual or of any approved construction. To each cheek-strap $a$ is secured a snap-hook, $f$, to receive the bit-rings $g$, which are of large diameter, as shown. Below the snap-hook $f$ is secured to the cheek-pieces $a$ the snap-hooks $h$, designed to receive bit-rings of small diameter, so that either large or small bit-rings may be used, as desired. The snap-hooks $f$ are free to swing upon their connections $f'$ to the cheek-straps, so that by a back-and-forth swinging movement they do not confine the bit-rings of large diameter, but compel the bit $j$ in the horse's mouth to move upward toward the snaps, bringing the pressure of the pull of the driver on the lips of the horse, instead of on his gums, thus doing away with the necessity for curb, chain, and other harsh bits, which first injure and then harden the horse's mouth.

The straps $a\ b\ c$ are connected together by rings $l'$ and a buckle, $l$, having a detachable shackle, $l^2$, held to the main frame $e$ of the buckle by a bolt, $e'$, so that by removing said bolt the said straps may be detached from each other without ripping.

When desired, the bits may be removed from the bridle by detaching the bit-rings from the snaps $f$, and other bits attached with rings of small diameter to enter the snaps $h$.

Having thus described our invention, what we claim as new, and desire to secure by Letters Patent, is—

In a bridle, the straps $a\ b\ c$, connected together by rings, and a buckle having a detachable shackle, substantially as and for the purposes set forth.

EDWIN CRIPPEN.
WILLIAM KING.

Witnesses:
MARCUS T. CASHEN,
JOHN PEEPLES.